US012572858B2

(12) United States Patent
You

(10) Patent No.: US 12,572,858 B2
(45) Date of Patent: Mar. 10, 2026

(54) PARKED VEHICLE CHARGING METHOD AND SYSTEM

(71) Applicants: Hyundai Motor Company, Seoul (KR); Kia Corporation, Seoul (KR)

(72) Inventor: Kyung Jin You, Anyang (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 592 days.

(21) Appl. No.: 17/702,357

(22) Filed: Mar. 23, 2022

(65) Prior Publication Data

US 2023/0004876 A1 Jan. 5, 2023

(30) Foreign Application Priority Data

Jul. 1, 2021 (KR) ........................ 10-2021-0086658

(51) Int. Cl.
*G06Q 10/02* (2012.01)
*B60L 53/64* (2019.01)
(Continued)

(52) U.S. Cl.
CPC .............. *G06Q 10/02* (2013.01); *B60L 53/64* (2019.02); *B60L 53/665* (2019.02); *B60L 58/12* (2019.02);
(Continued)

(58) Field of Classification Search
CPC .............. G06Q 10/02; G06Q 30/0283; G06Q 2240/00; B60L 53/64; B60L 58/12; B60L 53/665
See application file for complete search history.

(56) References Cited

U.S. PATENT DOCUMENTS

| | | | |
|---|---|---|---|
| 11,951,860 B2 * | 4/2024 | Salter | B60L 53/16 |
| 2011/0184587 A1 * | 7/2011 | Vamos | G06Q 30/06 |
| | | | 700/297 |

(Continued)

FOREIGN PATENT DOCUMENTS

| | | | |
|---|---|---|---|
| KR | 2019-0109719 A | | 9/2019 |
| KR | 20200063297 A | * | 6/2020 |

OTHER PUBLICATIONS

Raziq Yaqub, "Preferential Charging for Government Authorized Emergency-Electical Vehicles", T&D World, Oct. 31, 2019, 20 pages, (https://www.tdworld.com/print/content/20973333). (Year: 2019).*

(Continued)

*Primary Examiner* — Christopher Gomez
(74) *Attorney, Agent, or Firm* — Fox Rothschild LLP

(57) ABSTRACT

A parked vehicle charging method includes inputting vehicle information of a vehicle that is parked, parking space information, charging information requested by the vehicle, and necessary time information preliminarily secured by the vehicle to a management server, scheduling, by the management server, charging of the vehicle based on the requested charging information and the necessary time information of the vehicle, controlling, by the management server, charging intensity of charging equipment based on the vehicle information of the vehicle, the parking space information, and a charging schedule, and receiving, by the management server, charging result information from the charging equipment after charging end of the vehicle and calculating an amount of money to be charged to a user of the vehicle.

14 Claims, 7 Drawing Sheets

(51) Int. Cl.
   B60L 53/66          (2019.01)
   B60L 58/12          (2019.01)
   G06Q 30/0283        (2023.01)
   H02J 7/00           (2006.01)

(52) U.S. Cl.
   CPC .......... *G06Q 30/0283* (2013.01); *H02J 7/007*
         (2013.01); *H02J 7/0071* (2020.01); *G06Q*
         *2240/00* (2013.01); *H02J 7/00032* (2020.01)

(56)                   References Cited

U.S. PATENT DOCUMENTS

2017/0136912 A1*  5/2017  Ricci ........................ B60L 53/63
2020/0175551 A1*  6/2020  Penilla .................... B60L 53/80
2022/0388414 A1*  12/2022 Salter .................... B60L 53/305
2023/0365021 A1*  11/2023 Crossman .............. G06F 21/44

OTHER PUBLICATIONS

Raziq Yaqub, "Preferential Charging for Government Authorized Emergency-Electrical Vehicles", T&D World, Oct. 31, 2019, 20 pages, (https://www.tdworld.com/print/content/20973333). (Year: 2019).*

* cited by examiner

[FIG. 1]

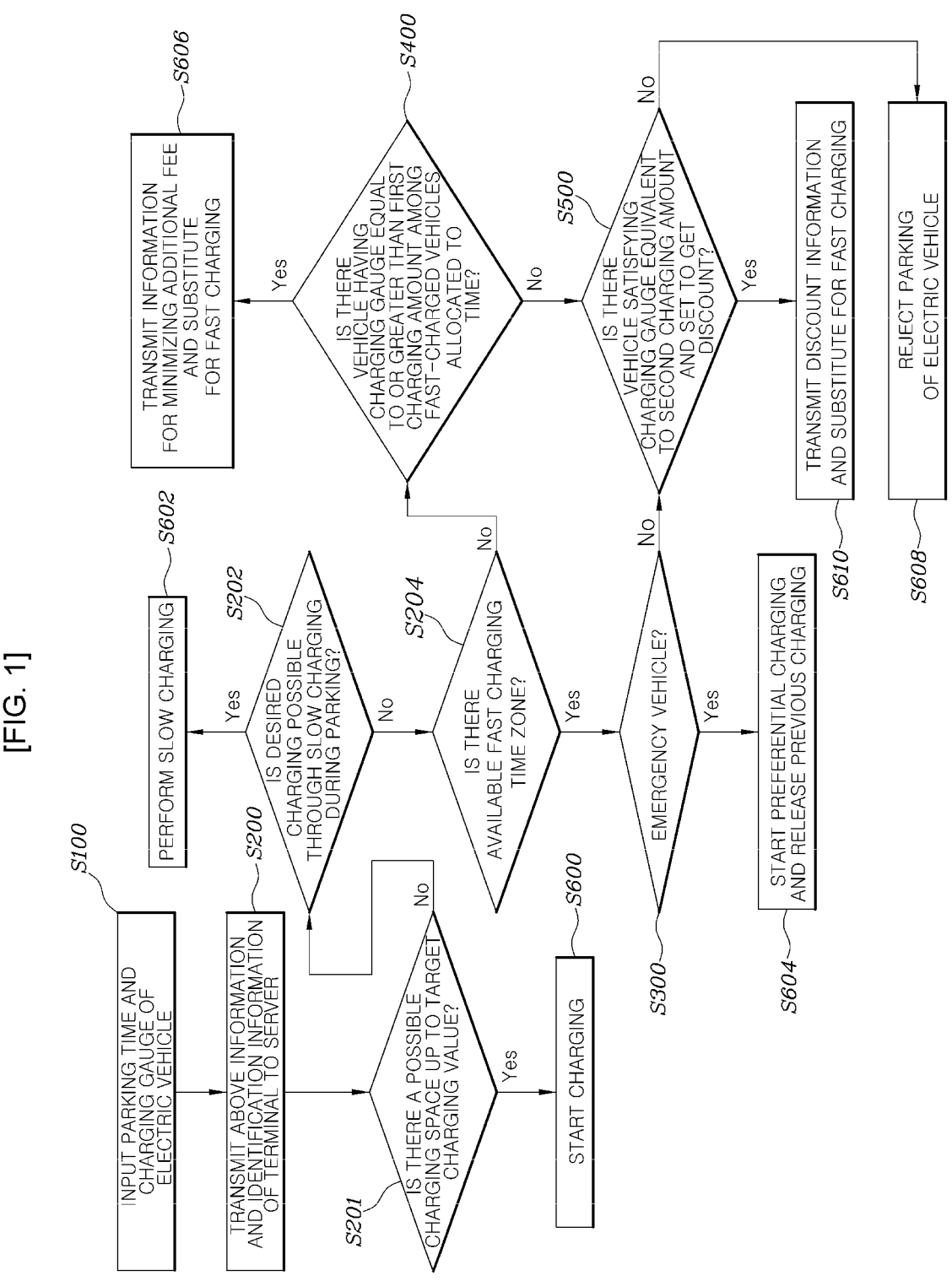

S606 TRANSMIT INFORMATION FOR MINIMIZING ADDITIONAL FEE AND SUBSTITUTE FOR FAST CHARGING

S400 IS THERE VEHICLE HAVING CHARGING GAUGE EQUAL TO OR GREATER THAN FIRST CHARGING AMOUNT AMONG FAST-CHARGED VEHICLES ALLOCATED TO TIME?

Yes

No

S500 IS THERE VEHICLE SATISFYING CHARGING GAUGE EQUIVALENT TO SECOND CHARGING AMOUNT AND SET TO GET DISCOUNT?

No

Yes

S610 TRANSMIT DISCOUNT INFORMATION AND SUBSTITUTE FOR FAST CHARGING

S608 REJECT PARKING OF ELECTRIC VEHICLE

S100 INPUT PARKING TIME AND CHARGING GAUGE OF ELECTRIC VEHICLE

S200 TRANSMIT ABOVE INFORMATION AND IDENTIFICATION INFORMATION OF TERMINAL TO SERVER

S202 IS DESIRED CHARGING POSSIBLE THROUGH SLOW CHARGING DURING PARKING?

Yes

S602 PERFORM SLOW CHARGING

No

S204 IS THERE AVAILABLE FAST CHARGING TIME ZONE?

No

Yes

S201 IS THERE A POSSIBLE CHARGING SPACE UP TO TARGET CHARGING VALUE?

No

Yes

S600 START CHARGING

S300 EMERGENCY VEHICLE?

No

Yes

S604 START PREFERENTIAL CHARGING AND RELEASE PREVIOUS CHARGING

[FIG. 2]

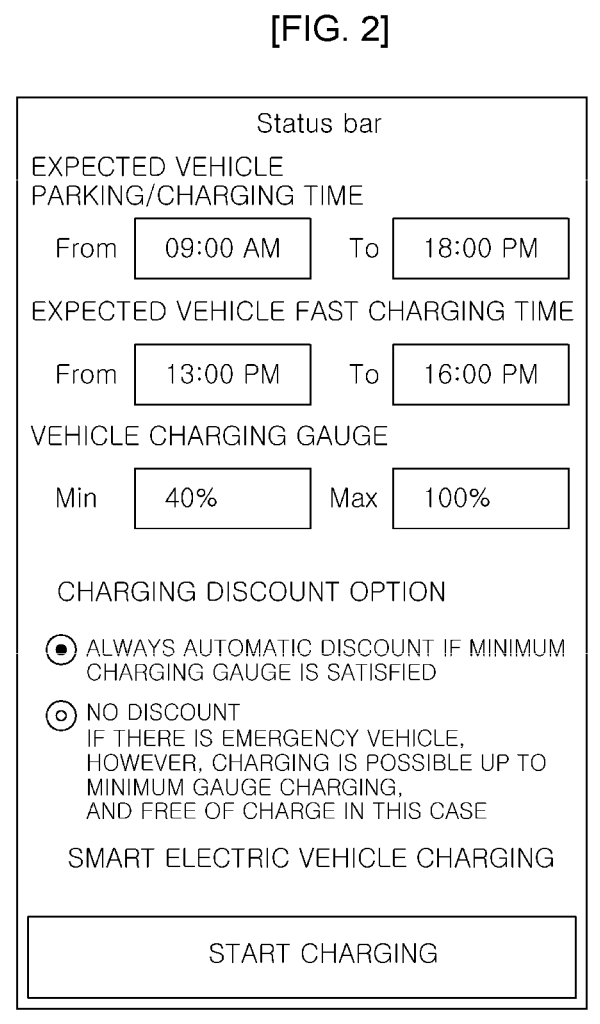

Status bar

EXPECTED VEHICLE
PARKING/CHARGING TIME

From | 09:00 AM | To | 18:00 PM

EXPECTED VEHICLE FAST CHARGING TIME

From | 13:00 PM | To | 16:00 PM

VEHICLE CHARGING GAUGE

Min | 40% | Max | 100%

CHARGING DISCOUNT OPTION

◉ ALWAYS AUTOMATIC DISCOUNT IF MINIMUM
   CHARGING GAUGE IS SATISFIED

◎ NO DISCOUNT
   IF THERE IS EMERGENCY VEHICLE,
   HOWEVER, CHARGING IS POSSIBLE UP TO
   MINIMUM GAUGE CHARGING,
   AND FREE OF CHARGE IN THIS CASE

SMART ELECTRIC VEHICLE CHARGING

START CHARGING

[FIG. 3]
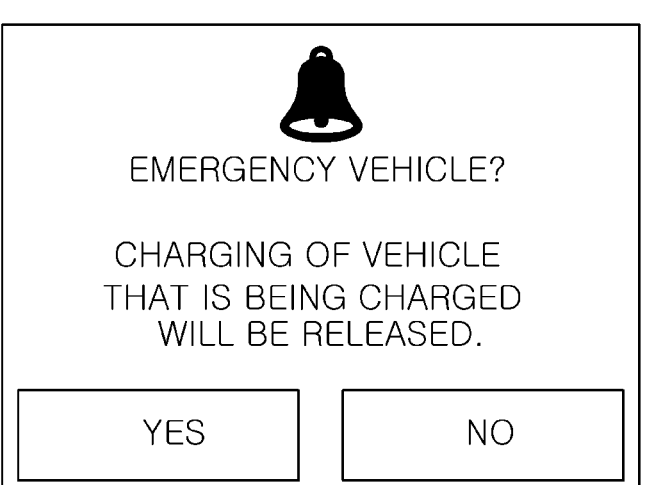

[FIG. 4]
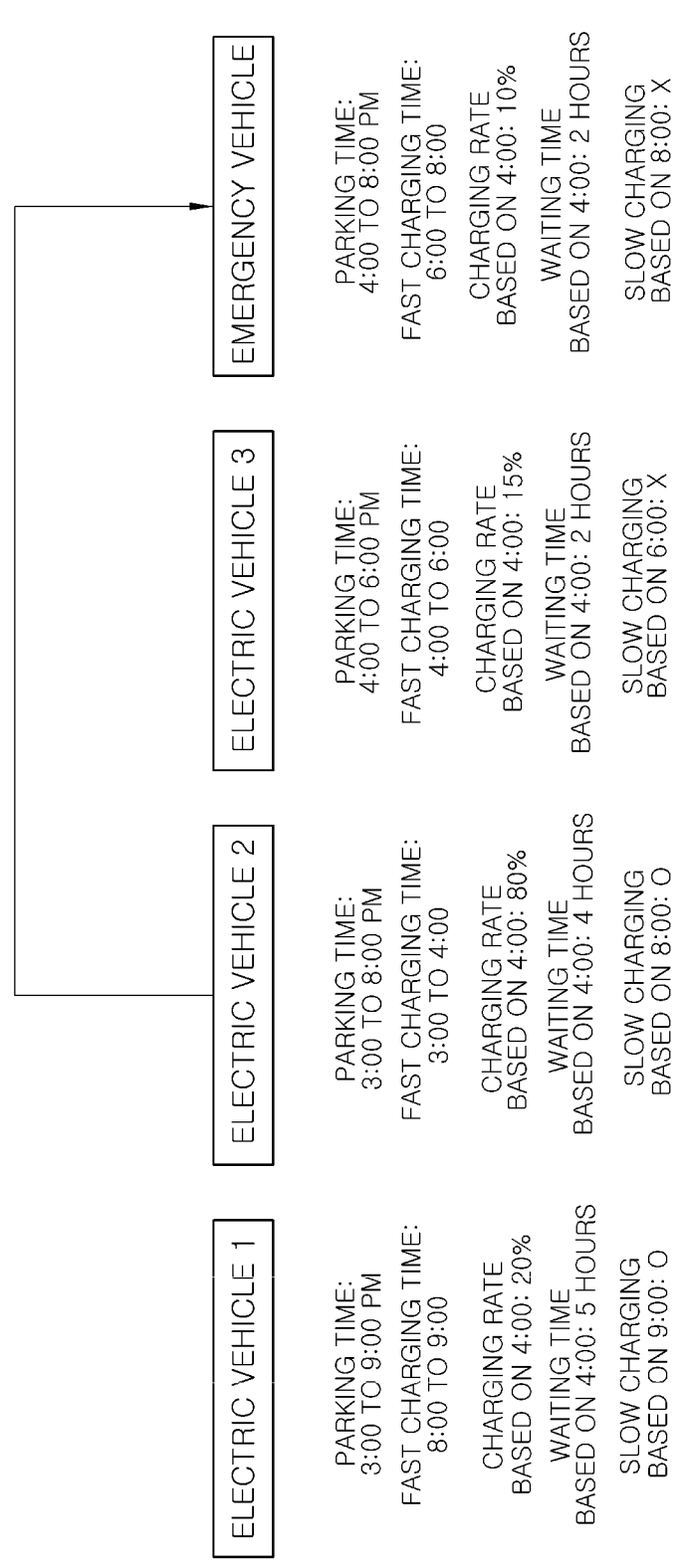

[FIG. 5]
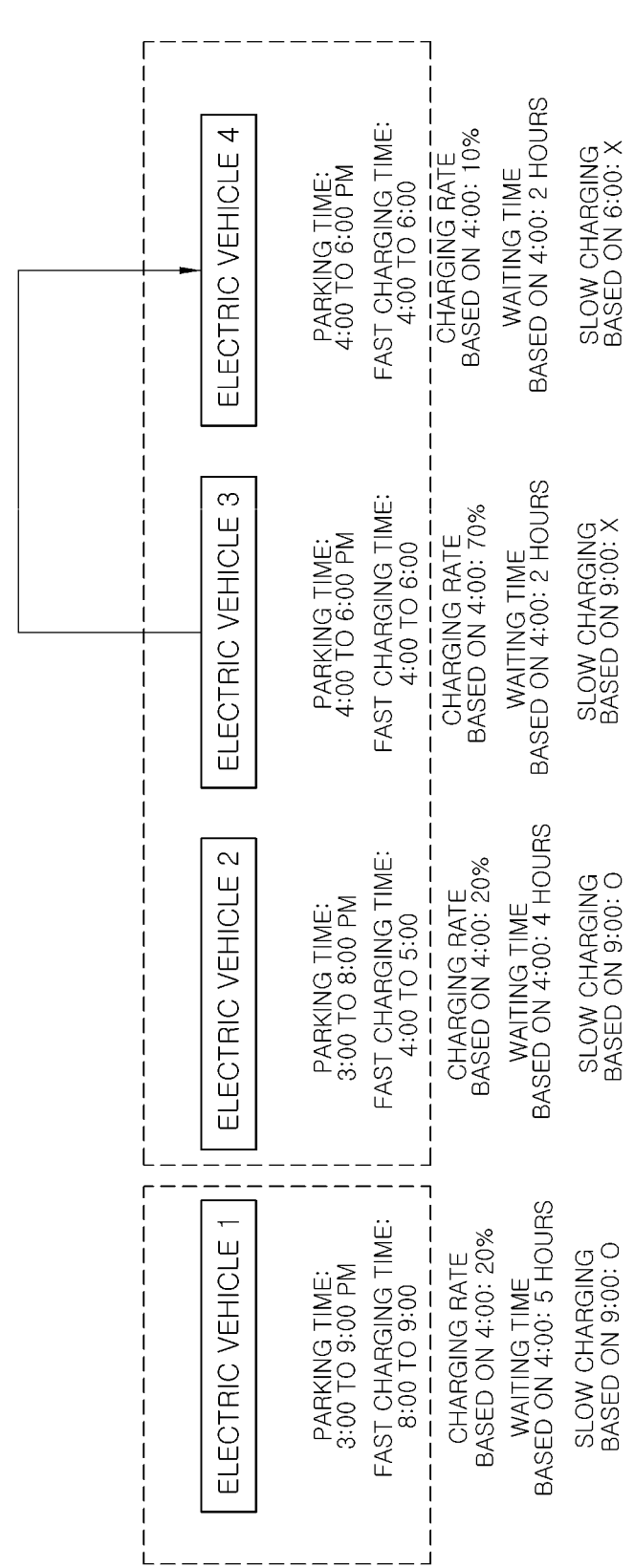

[FIG. 6]
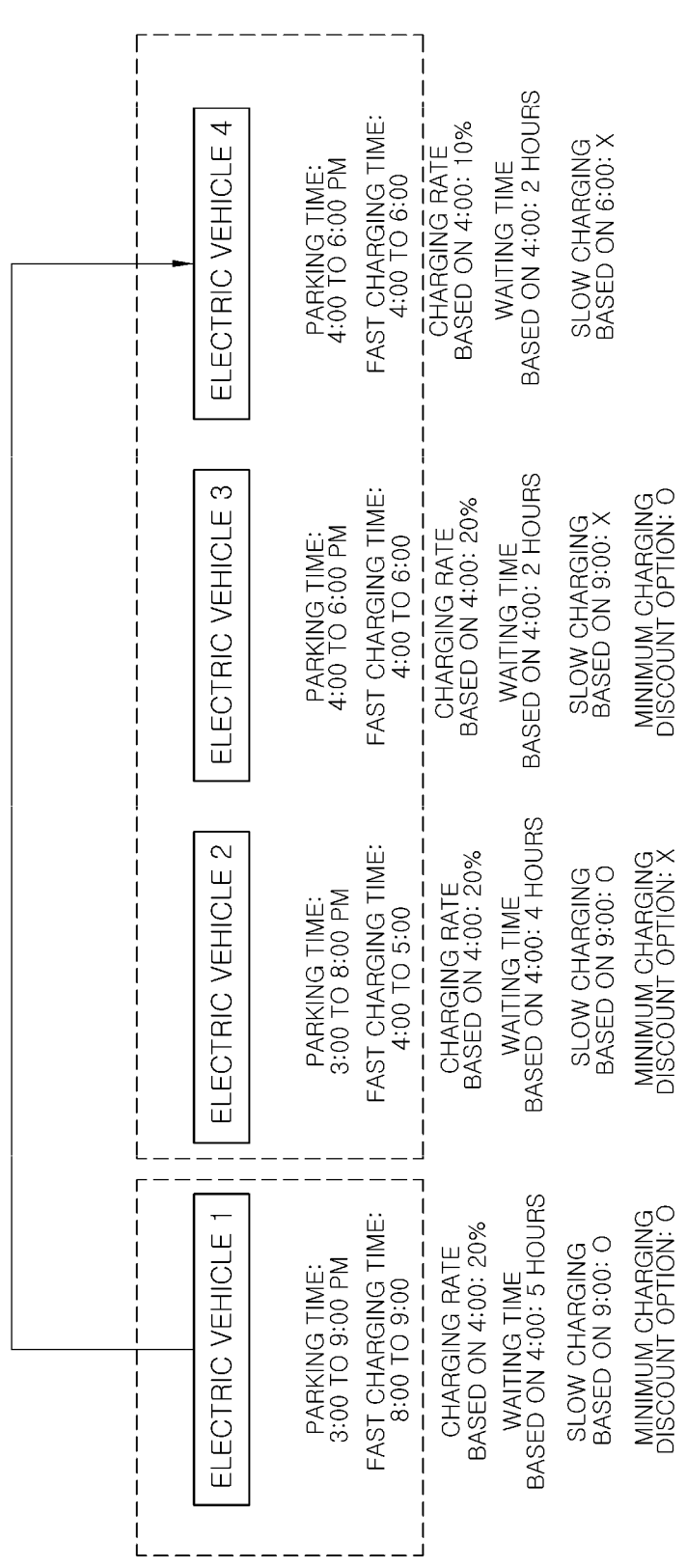

[FIG. 7]
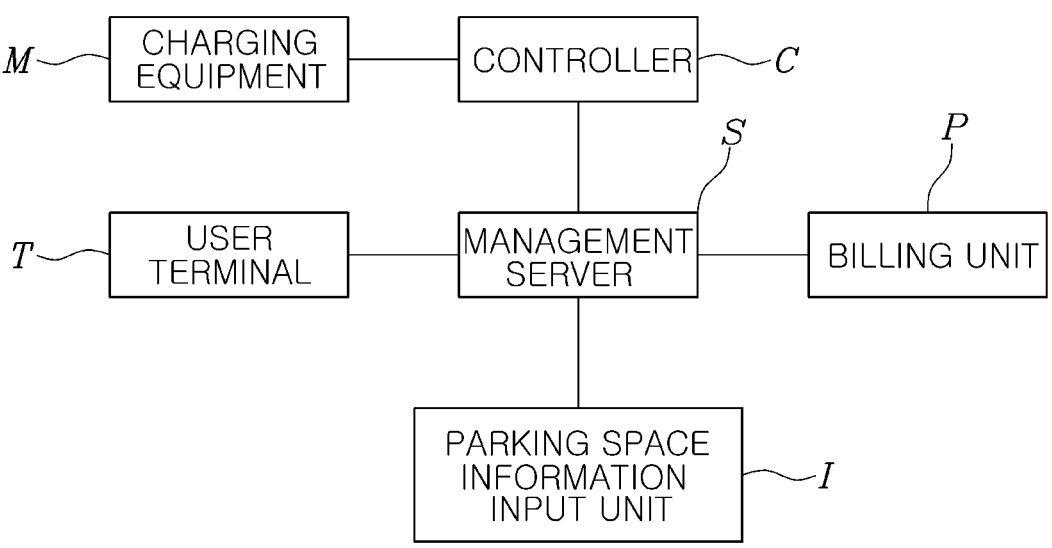
[FIG. 8]
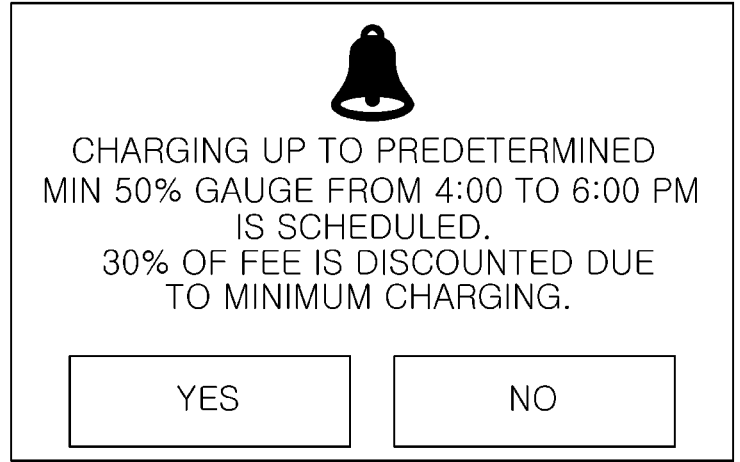

PARKED VEHICLE CHARGING METHOD AND SYSTEM

CROSS-REFERENCE TO RELATED APPLICATION

This application claims under 35 U.S.C. § 119(a) the benefit of Korean Patent Application No. 10-2021-0086658, filed on Jul. 1, 2021, in the Korean Intellectual Property Office, the entire contents of which are incorporated herein by reference.

BACKGROUND

Technical Field

The present disclosure relates to a parked vehicle charging method and system, and more particularly to a parked vehicle charging method and system configured such that charging equipment, including a mobile charging robot, charges a vehicle that is parked in a state of being interlocked with parking space information of the vehicle while controlling charging intensity, an amount of money charged to a user of the vehicle is calculated, charging concession of a previous charger, among parked vehicles, is induced, a charging service combined with parking is provided, whereby it is possible to improve user convenience, and limited charging equipment and charging capacity are redistributed, whereby it is possible to improve charging service quality.

Description of the Related Art

Types of vehicles can include gasoline/diesel vehicles configured to store and generate energy using fossil fuel, fuel cell vehicles configured to store and generate energy using hydrogen, and electric vehicles and hybrid vehicles configured to generate driving force using a battery configured to store electricity. A charging mode of the electric vehicle is mainly classified into fast charging and slow charging. It is also possible to switch between charging methods. Typically, a place for charging the electric vehicle that provides the above charging mode is a road-side electric charging station similar to a gas station for a gasoline or diesel engine vehicle, an electric charging station installed at homes or offices that are capable of supply electricity, or a mobile electric charging robot configured to move to a place at which the electric vehicle is parked in order to charge the electric vehicle.

Unlike a gas station for fossil fuel vehicles having no energy generation time except for fuel supply time, an electric charging apparatus has limitations in the maximum charging speed at which a battery for electric vehicles is charged with electricity and a charging amount that can be simultaneously charged. In the case where it is necessary to rapidly charge a plurality of vehicles at the same time, therefore, a problem in that a queue of fast charging consumers must be solved comes to the fore. In order to avoid dissatisfaction and provide fast charging for consumers, there is a necessity for reorganizing a charging service, e.g., collecting information about fast charging demand and substituting for fast charging of a previous vehicle that is being charged based thereon.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure has been made in view of the above problems, and it is an object of the present disclosure to provide a parked vehicle charging method and system configured such that charging equipment, including a mobile charging robot, charges a vehicle that is parked in a state of being interlocked with parking space information of the vehicle while controlling charging intensity, an amount of money charged to a user of the vehicle is calculated, charging concession of a previous charger, among parked vehicles, is induced, a charging service combined with parking is provided, whereby it is possible to improve user convenience, and limited charging equipment and charging capacity are redistributed, whereby it is possible to improve charging service quality.

In accordance with an aspect of the present disclosure, the above and other objects can be accomplished by a vehicle charging method including inputting vehicle information for a vehicle that is parked, parking space information, charging information requested by the vehicle, and necessary time information received by the vehicle to a management server, scheduling, by the management server, charging of the vehicle based on the requested charging information and the necessary time information of the vehicle, controlling, by the management server, charging intensity of charging equipment based on the vehicle information, the parking space information, and a charging schedule, receiving, by the management server, charging result information from the charging equipment after charging of the vehicle is completed, and calculating an amount of money to be charged to a user of the vehicle.

In the step of inputting the information to the management server, the requested charging information may include at least one of a current charging amount, a requested target charging amount, or a requested minimum charging amount of the vehicle. In the step of scheduling charging of the vehicle, a possible charging service time for slow charging from the current charging amount to the requested target charging amount and/or the requested minimum charging amount during parking of the vehicle may be scheduled.

In the step of inputting the information to the management server, the requested charging information may include at least one of information about an emergency charging intention for charging while having priority over charging of another vehicle having different parking space information or expected emergency charging time, In the step of scheduling charging of the vehicle, the necessary time information of a vehicle to be urgently charged and the necessary time information of the other vehicle having different parking space information may be compared with each other to schedule charging of the other vehicle.

In the step of scheduling charging of the vehicle, charging of a vehicle having highest charging capacity may be scheduled in the case in which there is a plurality of vehicles having different parking space information, and a vehicle having longest waiting time until completion may be scheduled in the case in which the vehicles have identical charging amounts.

In the step of inputting the information to the management server, the necessary time information may include at least one of expected parking time, expected charging time within the expected parking time, or expected fast charging time within the expected charging time. In the step of scheduling charging of the vehicle, the necessary time information of a vehicle to be scheduled and the necessary time information of another vehicle having different parking space information may be compared with each other to schedule a possible charging service time for fast charging.

In the step of inputting the information to the management server, the request charging information of the vehicle may include at least one of a current charging amount of the vehicle or a requested minimum charging amount of the vehicle. In the step of scheduling charging of the vehicle, in the case where fast charging is impossible as a result of comparison in the necessary time information of the vehicles, information about a charging intention up to the requested minimum charging amount of the other vehicle having different parking space information may be input and a possible charging service time for fast charging may be scheduled.

In the step of calculating the amount of money to be charged, a predetermined discount rate based on charging up to the requested minimum charging amount of the other vehicle having different parking area information may be applied to the amount of money to be charged based on charging result information to calculate the amount of money to be charged.

In the step of inputting the information to the management server, the requested charging information of the vehicle may include at least one of a current charging amount, a requested target charging amount, or a requested minimum charging amount of the vehicle. In the step of scheduling charging of the vehicle, necessary time information of the vehicles may be compared. When fast charging is impossible, information about a charging release intention of a vehicle having a current charging amount equal to or greater than a first charging amount, among vehicles having different parking space information, may be input and a possible charging service time for fast charging may be scheduled.

In the step of calculating the amount of money to be charged, a predetermined charging rate, differently set with respect to a plurality of sections divided by the current charging amounts of the vehicles, may be applied to the amount of money to be charged based on charging result information to calculate the amount of money to be charged.

In the step of scheduling charging of the vehicle, information about a charging release intention of another vehicle having a current charging amount equal to or greater than a first charging amount and having a highest charging amount may be input and a possible charging service time for fast charging may be scheduled.

In the step of scheduling charging of the vehicle, in the case in which there are a plurality of other vehicles having highest charging amounts, information about a charging release intention of a vehicle having a lowest amount of money to be charged to the user of the vehicle based on charging result information may be input and a possible charging service time for fast charging may be scheduled.

In the control step, the charging equipment may be a mobile charging robot.

The parked vehicle charging method may further include, after the step of scheduling charging of the vehicle, comparing necessary time information of a vehicle to be scheduled and necessary time information of another vehicle having different parking space information with each other to schedule charging of the other vehicle. The management server may transmit scheduling information and information about a predetermined discount rate based thereon to a user terminal of the other vehicle in the step of scheduling charging of the other vehicle.

In the step of scheduling charging, information included in scheduling of charging may include at least one selected from the group consisting of: whether slow charging is possible, whether fast charging is possible, a charging fee based on slow charging or fast charging, an additional fee at the time of emergency charging, an additional fee at the time of fast charging, charging schedule information scheduled at the time of fast charging in the same time zone as another vehicle having different parking space information, charging release information based on emergency charging of the other vehicle having different parking space information, a discounted fee at the time of charging release or scheduling, or expected time taken until charging is completed.

In accordance with another aspect of the present disclosure, a parked vehicle charging system is provided and includes a management server configured to schedule charging of a vehicle that is parked based on charging information requested by the vehicle and necessary time information preliminarily secured by the vehicle, to control charging intensity of charging equipment based on vehicle information, parking space information, and a charging schedule of the vehicle, to receive charging result information from the charging equipment after charging of the vehicle is completed, and to calculate an amount of money to be charged to a user of the vehicle.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a flowchart showing a parked vehicle charging method according to an embodiment of the present disclosure;

FIGS. 2 and 3 are views showing an input step of the parked vehicle charging method according to the embodiment of the present disclosure;

FIG. 4 is a view showing the mechanism of a parked vehicle charging method according to a first embodiment of the present disclosure;

FIG. 5 is a view showing the mechanism of a parked vehicle charging method according to a second embodiment of the present disclosure;

FIG. 6 is a view showing the mechanism of a parked vehicle charging method according to a third embodiment of the present disclosure;

FIG. 7 is a view showing the construction of a parked vehicle charging system according to an embodiment of the present disclosure; and FIG. 8 is a view showing an output step of the parked vehicle charging method according to an embodiment of the present disclosure based on rescheduling of another parked vehicle.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions of the embodiments of the present disclosure disclosed in this specification or this disclosure are given only for illustrating embodiments of the present disclosure. Embodiments of the present disclosure may be realized in various forms, and should not be interpreted to be limited to the embodiments of the present disclosure disclosed in this specification or this application. In addition, same or similar elements are denoted by same or similar reference numerals, and a duplicated description thereof will be omitted. Also, in describing embodiments disclosed in this specification, a detailed description of known technologies related thereto will be omitted when the same may obscure the subject matter of the embodiments disclosed in this specification.

A singular representation may include a plural representation unless it represents a definitely different meaning from the context. It will be further understood that the term "includes," when used in this specification, specify the presence of stated features, numbers, steps, operations, elements, components or combinations thereof, but do not preclude the presence or addition of one or more other features, numbers, steps, operations, elements, components, or combinations thereof. Hereinafter, preferred embodiments of the present disclosure will be described in detail with reference to the accompanying drawings.

In addition, the term "charging," when used herein, is supplying fuel. For a vehicle, charging includes supplying fossil fuel to an engine, supplying hydrogen to a hydrogen fuel cell, charging a battery connected to a motor with electricity, supplying fuel to a device capable of generating driving force of the vehicle, supplying energy to the device capable of generating driving force, or providing energy to the device capable of generating driving force so as to be stored. In addition, the terms "fast charging" and "slow charging," when used herein, are charging modes of charging equipment indicating different charging intensities. However, each of fast charging and slow charging is not limited to a single mode. Fast charging includes a plurality of charging modes having different charging intensities divided into various levels, including "ultra-fast charging," and slow charging includes a plurality of charging modes having different charging intensities divided into various levels, including "ultra-slow charging."

FIG. 1 is a flowchart showing a parked vehicle charging method according to an embodiment of the present disclosure, FIGS. 2 and 3 are views showing an input step of the parked vehicle charging method according to the embodiment of the present disclosure, FIG. 4 is a view showing the mechanism of a parked vehicle charging method according to a first embodiment of the present disclosure, FIG. 5 is a view showing the mechanism of a parked vehicle charging method according to a second embodiment of the present disclosure, FIG. 6 is a view showing the mechanism of a parked vehicle charging method according to a third embodiment of the present disclosure, FIG. 7 is a view showing the construction of a parked vehicle charging system according to an embodiment of the present disclosure, and FIG. 8 is a view showing an output step of the parked vehicle charging method according to an embodiment of the present disclosure based on rescheduling of another parked vehicle, and FIG. 1 is a flowchart showing a parked vehicle charging method according to an embodiment of the present disclosure. The parked vehicle charging method includes a step (S100 and S200) of inputting vehicle information of a vehicle that is parked, parking space information, charging information requested by the vehicle, and necessary time information preliminarily secured by the vehicle to a management server. The parked vehicle charging method also includes a step (S202, S204, and S300 to S500) of scheduling, by the management server, charging of the vehicle based on the requested charging information and the necessary time information of the vehicle. The parked vehicle charging method further includes a step (S600 to S608) of controlling, by the management server, charging start, charging end, and charging intensity of charging equipment based on the vehicle information of a vehicle, the parking space information, and a charging schedule. The parked vehicle charging method additionally includes and a step of receiving, by the management server, charging result information from the charging equipment after charging end of the vehicle and calculating an amount of money to be charged to a user of the vehicle.

As shown in FIG. 1, a first step is a step (S100 and S200) of inputting or transmitting vehicle information/parking space information/requested charging information/necessary time information to a management server. Here, a vehicle that is parked may be an electric vehicle. Vehicle information of the electric vehicle may be at least one of a specific type of the electric vehicle, information about a battery configured to drive a motor mounted in the specific type of electric vehicle, or information about a second battery configured to charge the battery, a charging mode, or a charging port.

The parking space information includes at least one of a parking area, a portion of the parking area designated as a charging sector, a charging area for each parking fee, parking area information of another vehicle that is parked, or a distance between charging sectors. The charging information requested by the vehicle may include at least one of a requested target charging amount, a requested minimum charging amount, or a requested emergency charging amount based on emergency charging (preferential charging irrespective of charging order) in comparison to a charging gauge, e.g., the current charging amount, as shown in FIG. 1.

The necessary time information preliminarily secured by the vehicle may include at least one of expected parking time of the vehicle, expected charging time within the expected parking time, expected fast/slow charging time within the expected charging time, expected time of another vehicle that conflicts with a time zone of the vehicle, or waiting time until charging is completed.

In the next step, the management server schedules charging of the vehicle based on the above information (S202, S204, and S300 to S500). Here, scheduling is determining whether charging is possible based on at least a portion of the above information, determining whether to provide a charging service, such as a charging mode, a charging start point, a charging end point, and/or charging speed based thereon, a charging fee, and/or whether another vehicle that waits or is being charged has an intention of charging concession, determining a mode in which the charging service is provided in the case in which the charging service is capable of being provided, and/or providing a scheduled charging service to a person who wishes to charge the parked vehicle. Specifically, as part of a step of determining whether slow charging is possible, scheduling may include a step of determining whether charging to a desired level (e.g., a target or requested minimum charging amount) is possible through slow charging during parking (S202). As a step of determining whether fast charging is possible, scheduling may include a step of determining whether there is an available fast charging time zone through comparison with a charging schedule of another vehicle (S204).

In the case in which there is an available fast charging time zone, a step of inputting information can include requesting information about whether the vehicle is a vehicle to be urgently charged that wishes to use fast charging prior to the time zone, e.g., an emergency vehicle (S300). In the case where the input information indicates that the vehicle is an emergency vehicle, charging of a previous vehicle under fast charging may be released or may be converted into slow charging.

In the case in which fast charging is impossible, the method may include a step of retrieving, by the management server, whether there is a substitution vehicle having a charging gauge in which a (predicted) charging amount is the requested minimum charging amount, the requested target charging amount, or a first charging amount, which is a predetermined charging amount (e.g. 80%), or more based on a start point of expected fast charging time, among other fast-charged vehicles allocated to the time (S400). In the case in which there is no substitution vehicle, the method may include a step of retrieving, by the management server, whether there is a vehicle having an intention of substitution, e.g., a vehicle that satisfies a charging gauge equal to or greater than a second charging amount including the requested minimum charging amount and that gets a discount (S500).

A parked vehicle charging method according to another embodiment of the present disclosure may include a step of retrieving, by the management server, whether there is a vehicle that satisfies a charging gauge equal to or greater than a third charging amount, which is a necessary requested charging amount of a vehicle that inputs an intention to switch from fast charging to slow charging and that gets a discount (S500).

After the step of determining whether charging based on charging scheduling is possible, embodiments of the parked vehicle charging method may include a step of determining possible slow charging (S602)/emergency charging (S604)/fast charging time (S606 and S610), interruption/switching time of a charging service of another vehicle having the same time zone based thereon, whether charging of the other vehicle is released, calculating a charging fee based on pre-stored data or data about charging and fee information input to the management server, or a step (S608) of rejecting parking and charging accompanied thereby.

A conventional parked vehicle charging method provides only a charging service requested by a user without utilization of parking information. Particularly, in an electric charging service in which the maximum charging speed, the number of vehicles that can be simultaneously charged, and the charging amount of the vehicles are limited, the charging service is provided in order requested by users without utilization of parking information, whereby user inconvenience increases due to delay of the charging service caused by waiting time. That is, in the case in which parking information or charging information is not shared without charging concession or parking concession of the users, waiting vehicles are congested. Particularly, for a charging station in which a parking area and a charging area are divided from each other or in the case in which a mobile charging robot approaches a parked vehicle that wishes to use a charging service to charge the vehicle, conflict becomes more serious.

In contrast, embodiments of the disclosed parked vehicle charging method according to the embodiment of the present disclosure provide the ability to rapidly determine whether a charging service is usable simultaneously with parking by scheduling charging of a parked vehicle based on parking area information and vehicle information and requested charging information generated by the vehicle. Although a user may provide charging service request information through a terminal, a parked vehicle is recognized during a parking process, a parking start point and a parking end point based thereon are recognized, and a charging start point and a charging end point corresponding thereto are calculated in advance, whereby such a service is possible. In addition, information about which of charging services is usable, in which parking area the vehicle can be parked, and how different fees are may be shared only by parking. That is, information in which the parking area, the kind of charging service, and a fee are visualized together based on a charging schedule may be shared only by parking.

This functionality may be provided by the management server through a user terminal. To this end, identification information of the user terminal (e.g., phone number, terminal ID, and ID of a parking application or a charging application) may be input and stored in advance. Alternatively, the identification information may be provided by the management server through a terminal installed at a place at which the parking service is provided or a terminal installed at a mobile charging apparatus. That is, charging service information may be processed and provided together with a parking space through vehicle information and parking area information input when the parking service is used or input through a camera.

In embodiments of the parked vehicle charging method, an option for selecting charging concession of a previous charger, among the parked vehicles, may be provided simultaneously with parking in order to induce charging concession. In this manner, limited charging equipment and charging capacity may be redistributed, and therefore it is possible to improve charging service quality. As a result, the parked vehicle charging method is optimized to provide a vehicle charging service synchronized with parking information.

FIG. 2 is a view showing an input step of an embodiment of the parked vehicle charging method. In the step of inputting the information to the management server, requested charging information may include at least one of the current charging amount, requested target charging amount, or requested minimum charging amount of the vehicle. In the step of scheduling charging of the vehicle, a possible charging service time for slow charging from the current charging amount to the requested target charging amount or the requested minimum charging amount during parking of the vehicle may be scheduled.

As shown in FIG. 2, in the step of inputting the information to the management server, at least one of expected parking time, expected charging time within the expected parking time, expected fast charging time, minimum/maximum (target) requested charging gauge, or a discount option based on minimum charging concession or emergency charging concession may be input. In this manner, a possible charging service time may be scheduled, such as whether slow charging is possible may be scheduled. Since whether slow charging is possible is scheduled while having priority over other services that charge higher fees than slow charging, the parked vehicle charging method according to the embodiment of the present disclosure is capable of improving user satisfaction.

FIG. 3 is a view showing an input step of an embodiment of the parked vehicle charging method. In the step of inputting the information to the management server, requested charging information includes at least one of information about an emergency charging intention for charging while having priority over charging of another vehicle having different parking space information or expected emergency charging time. As shown in FIG. 3, information about an emergency charging intention may be output to a terminal of a consumer who cannot perform, or does not desire, slow charging after designating or inputting a parking space. Of course, emergency charging may be fast charging, and charging intensity, such as ultra-fast charging or accelerated charging faster than the fast charging, and charging completion time based thereon may be selected. Charging of a vehicle that is being charged may be released, and an amount of money to be charged including a charge rate may be calculated (not shown) and output to the terminal. Consequently, the parked vehicle charging method according to the embodiment of the present disclosure is capable of satisfying emergency charging demand of the consumer and at the same time providing an option.

FIG. 4 is a view showing the mechanism of a parked vehicle charging method according to a first embodiment of the present disclosure. In the step of scheduling charging of the vehicle, necessary time information of a vehicle to be urgently charged and necessary time information of another vehicle having different parking space information may be compared with each other to schedule charging of the other vehicle. Also, in the step of scheduling charging of the vehicle, it is possible to schedule charging of a vehicle having highest charging capacity in the case in which there is a plurality of vehicles having different parking space information and to schedule a vehicle having the longest waiting time until completion in the case in which the vehicles have the same charging amounts. As shown in FIG. 4, an emergency vehicle is a vehicle that requests emergency charging from a starting point of parking time (4:00 pm). At this time, it is possible to reschedule fast charging of vehicles having time overlapping fast charging time and having different parking space information (electric vehicle 2 and electric vehicle 3). That is, rescheduling may be performed to switch from fast charging to slow charging or to release charging. At this time, electric vehicle 2, which is a vehicle having the highest charging capacity, may be rescheduled. As a result, rapid charging service redistribution may be achieved, and, in this redistribution process, a charged fee/charge rate of the emergency vehicle and a discounted fee/discount rate of the concession vehicle may be applied to a billing calculation step. Of course, a discount may be provided in the form of a voucher or a coupon. Consequently, the parked vehicle charging method according to the first embodiment of the present disclosure is capable of smoothly providing an emergency charging service of an emergency vehicle and at the same time to reschedule another vehicle having overlapping necessary time information, whereby it is possible to appropriately solve an emergency vehicle queue.

FIG. 5 is a view showing the mechanism of a parked vehicle charging method according to a second embodiment of the present disclosure. In the step of inputting the information to the management server, necessary time information may include at least one of expected parking time, expected charging time within the expected parking time, or expected fast charging time within the expected charging time. In the step of scheduling charging of the vehicle, necessary time information of a vehicle to be scheduled, and necessary time information of another vehicle having different parking space information, may be compared with each other to schedule a possible charging service time for fast charging.

As shown in FIG. 5, requested fast charging time (4:00 to 6:00) of electric vehicle 4, which newly entered, and requested fast charging times (4:00 to 5:00 and 4:00 to 6:00) of electric vehicles 2 and 3 having different parking space information conflict with each other. At this time, the requested fast charging time of electric vehicle 3, which has a higher charging rate based on 4:00, may be rescheduled. In another embodiment, it may be determined that the charging rate based on 4:00 is equal to or greater than the requested target/minimum charging amount of electric vehicle 3, and the requested fast charging time of electric vehicle 3 may be rescheduled. In a further embodiment, in the case in which electric vehicle 3 and electric vehicle 2 have the same charging amounts, charging of electric vehicle 2, which is a vehicle having the longest waiting time until charging is completed, may be scheduled. As a result, the parked vehicle charging method according to the second embodiment or the other embodiment of the present disclosure is capable of appropriately solving a fast charging queue.

FIG. 6 is a view showing the mechanism of a parked vehicle charging method according to a third embodiment of the present disclosure. In the step of inputting the information to the management server, the requested charging information of the vehicle may include at least one of the current charging amount of the vehicle or the requested minimum charging amount of the vehicle. In the step of scheduling charging of the vehicle, when fast charging is impossible as the result of comparison in the necessary time information of the vehicles, information about a charging intention up to the requested minimum charging amount of another vehicle having different parking space information may be input, and a possible charging service time for fast charging may be scheduled.

As shown in FIG. 6, electric vehicle 1 and electric vehicle 2 can be slowly charged during parking, and thus are scheduled to be slow-charged with the exception of rapid charging time. On the other hand, it is determined that electric vehicle 3 and electric vehicle 4 cannot be slowly charged during parking, and therefore fast charging is scheduled. However, expected fast charging time of electric vehicle 4, which newly entered, conflicts with expected fast charging time of each of electric vehicle 2 and electric vehicle 3. Expected fast charging time of electric vehicle 4 does not conflict with expected fast charging time of electric vehicle 1 (8:00 to 9:00). In the case in which the minimum charging discount option, i.e. the required minimum charging amount in the conflicting fast charging time zone, is satisfied, rescheduling may be performed such that electric vehicles 1 and 3 that select a fast charging concession option concede fast charging. In the case in which electric vehicle 1 concedes, rescheduling may be performed such that slow charging of electric vehicle 1 performed in the expected fast charging time (4:00 to 6:00) of electric vehicle 4 is stopped or charging speed is further reduced, whereby fast charging time (8:00 to 9:00) of electric vehicle 1 is increased. In the case in which electric vehicle 3 concedes, unlike FIG. 6, rescheduling may be performed such that electric vehicle 3 is fast-charged up to the requested minimum charging amount (e.g. 50%), fast charging of electric vehicle 3 is stopped, and fast charging is conceded to electric vehicle 4. Of course, in the case in which options as in electric vehicle 1 and 3 are not selected, unlike FIG. 6, scheduling to deny parking and charging of the electric vehicles may be performed.

In the third embodiment and the other embodiments of the present disclosure, the necessary time information including the expected fast charging time is compared, and the minimum charging discount option is further considered to schedule whether a fast charging service is possible, unlike the second embodiment of the present disclosure. Consequently, the second embodiment is capable of more appropriately solving a fast charging queue.

FIG. 8 is a view showing an output step of an embodiment of the parked vehicle charging method based on rescheduling of another parked vehicle. In the step of calculating an amount of money to be charged, a predetermined discount rate based on charging up to the requested minimum charging amount of another vehicle having different parking area information may be applied to an amount of money to be charged based on charging result information to calculate the amount of money to be charged. In other words, as shown in FIG. 8, the requested minimum charging amount (50%)/discount rate (30%) may be applied to calculate an amount of money to be charged in order to induce selection of a minimum charging discount option. In this case, it is also possible to more appropriately solve a fast charging queue.

In embodiments of the vehicle charging method, in the step of inputting the information to the management server, requested charging information of the vehicle may include at least one of the current charging amount, requested target charging amount, or requested minimum charging amount of the vehicle. In the step of scheduling charging of the vehicle, necessary time information of the vehicles is compared. When fast charging is impossible, information about a charging release intention of a vehicle having a current charging amount equal to or greater than a first charging amount, among vehicles having different parking space information, may be input, and a possible charging service time for fast charging may be scheduled. Also, in the step of calculating the amount of money to be charged, a predetermined charging rate differently set with respect to a plurality of sections divided by the current charging amounts of the vehicles may be applied to the amount of money to be charged based on charging result information to calculate the amount of money to be charged. That is, in embodiments of the present disclosure, when fast charging is impossible, it is possible to substitute for fast charging of a vehicle in which a (predicted) charging amount is the requested minimum charging amount, the requested target charging amount, or a first charging amount, which is a predetermined charging amount (e.g. 80%), or more based on a start point of the expected fast charging time, among other fast-charged vehicles allocated to the time. Consequently, it is possible to appropriately solve a fast charging user queue.

Also, in the vehicle charging method according to the embodiment of the present disclosure, in the step of scheduling charging of the vehicle, information about a charging release intention of another vehicle having a current charging amount equal to or greater than a first charging amount and having the highest charging amount may be input, and a possible charging service time for fast charging may be scheduled. Also, in the step of scheduling charging of the vehicle, in the case in which there is a plurality of other vehicles having the highest charging amounts, information about a charging release intention of a vehicle having the lowest amount of money to be charged to the user of the vehicle based on charging result information may be input, and a possible charging service time for fast charging may be scheduled. That is, priority may be provided to a plurality of fast-charged substitution vehicles, whereby it is possible to appropriately solve a fast charging user queue.

Meanwhile, in embodiments of the vehicle charging method, in the control step, the charging equipment may be a mobile charging robot. It is possible to provide a charging service combined with parking therethrough without any help of the user, and therefore a mobile charging robot that finds an optimum charging sequence and movement route based on parking space information may perform a charging service and fee charging in a state of setting charging scheduling and a billing system based on charging completion. Consequently, it is possible to further improve convenience of a charging service user who must manually charge and manually pay a parking fee and charging fee in the conventional art.

Embodiments of the vehicle charging method may further include comparing necessary time information of a vehicle to be scheduled and necessary time information of another vehicle having different parking space information with each other to schedule charging of the other vehicle after the step of scheduling charging of the vehicle. Additionally, the management server may transmit scheduling information and information about a predetermined discount rate based thereon to a user terminal of the other vehicle in the step of scheduling charging of the other vehicle. That is, information may be transmitted and received through an application or an interface installed in the user terminal, whereby the user may more smoothly receive a billing system including discount information and charge rate information or charging information not only at the time of parking but also after parking, and therefore it is possible to provide a service capable of enhancing user experience.

In embodiments of the vehicle charging method, in the step of scheduling charging, information included in scheduling of charging may include at least one selected from the group consisting of: whether slow charging is possible, whether fast charging is possible, a charging fee based on slow charging or fast charging, an additional fee at the time of emergency charging, an additional fee at the time of fast charging, charging schedule information scheduled at the time of fast charging in the same time zone as another vehicle having different parking space information, charging release information based on emergency charging of the other vehicle having different parking space information, a discounted fee at the time of charging release or scheduling, or expected time taken until charging is completed.

In embodiments of the vehicle charging method, an agent that performs the step of inputting vehicle information of a vehicle to be parked, parking space information, charging information requested by the vehicle, and necessary time information preliminarily secured by the vehicle may include a terminal. The terminal may be a terminal of the vehicle user, a terminal installed in the vehicle, a terminal installed outside the vehicle, a terminal installed in a parking space or near a space through which the vehicle enters the parking space and exits the parking space, or a terminal mounted at charging equipment. Alternatively, the agent that performs the input step may be a sensor mounted in the vehicle, a sensor configured to receive vehicle and battery information for vehicle charging mounted at a vehicle charging port of the charging equipment, or a first transmission unit configured to process sensing information of the sensor and transmitting the result of processing to the management server. Alternatively, the agent that performs the input step may be a device installed in a parking space or near a space through which the vehicle enters the parking space and exits the parking space to receive image data, such as a camera, and a second transmission unit configured to process the data and transmitting the result of processing to the management server. Alternatively, the agent that performs the input step may be a storage unit configured to receive and store the above information and to retrieve pre-stored data.

In addition, embodiments of the vehicle can include a gasoline or diesel vehicle configured to generate driving force through combustion of fossil fuel, such as gasoline or diesel, an electric vehicle or a hybrid vehicle configured to generate driving force using a battery, a hydrogen vehicle configured to generate energy using a fuel cell, and a mobility configured to generate driving force using a battery or a fuel cell. Consequently, charging may be supplying energy by storing energy in an energy storage device, such as a battery, or supplying fuel by storing fuel in a fuel storage device near an energy generation device, such as an engine or a fuel cell.

In addition, a charging port and a charging gun connected to the charging equipment of the vehicle to fill the vehicle with fuel may be disposed at a specific place at the front or rear of the vehicle, and position information thereof in the vehicle may be transmitted to the charging equipment. The charging equipment may be a mobile charging robot. In the case in which the vehicle enters a specific charging sector, parking space information may be generated through a camera or an infrared sensor mounted therearound and may be transmitted to the charging equipment. The charging equipment may be provided with a camera, by which vehicle information may be generated. In the case in which a plurality of pieces of charging equipment is provided, a piece of charging equipment that is closest to the charging sector and is available may be selected.

Parking space information of the vehicle may be manually provided to the management server by the user through the terminal, or may be tracked through a transmission and reception unit or a sensing unit installed in a parking lot and may be provided to the management server. Alternatively, parking space information of the vehicle may be provided through a company that charges a parking fee and provides a parking service at the time of parking or leaving, or may be stored through single input and may then be provided.

The charging equipment can include a charging station installed at a specific place, such as a gas station for gasoline and diesel engine vehicles, a manual mobile charging service provider configured to manually open an outlet and to provide charging power to a vehicle that wishes to use a charging service, or an automatic mobile charging service robot configured to automatically open an outlet and to provide charging power to a vehicle that wishes to use a charging service. A plurality of pieces of charging equipment may be installed in a single parking space. The charging equipment may charge a single vehicle, or may simultaneously charge a plurality of vehicles.

An amount of money to be charged may be a charging fee. Alternatively, the amount of money to be charged may be a charging fee and a parking fee. A discount may be provided in a manner of charging a discounted fee. Alternatively, the discount may be provided in the form of a coupon or a voucher. The coupon or the voucher may be used until the expiration date. In the case in which electricity is charged, electric charges may be different depending on charging time zone. Consequently, the driver may reserve discount time, which is a time zone having low electric charges, as charging time in order to perform charging.

FIG. 7 is a view showing the construction of a parked vehicle charging system according to an embodiment of the present disclosure. The parked vehicle charging system according to the embodiment of the present disclosure includes a management server S configured to schedule charging of a vehicle that is parked based on charging information requested by the vehicle and necessary time information preliminarily secured by the vehicle, to control charging start, charging end, and charging intensity of charging equipment based on vehicle information, parking space information, and a charging schedule of the vehicle, to receive charging result information from the charging equipment after charging end of the vehicle, and to calculate an amount of money to be charged to a user of the vehicle.

As shown in the embodiment of FIG. 7, charging equipment M receives or stores charging information requested by the vehicle and necessary time information preliminarily secured by the vehicle through the management server S. In particular, necessary time information, such as expected charging/parking time, expected fast/slow charging time, and/or a minimum charging discount option, may be input and output through a user terminal T. The management server S schedules charging of the vehicle based on the received requested charging information and necessary time information.

In addition, the management server S may receive parking space information and information about a parking available space and a space at which the vehicle is parked through a parking space information input unit I. In order for management server S to charge a parked vehicle recognized through the parking space information according to a charging schedule, a controller C configured to control the charging equipment M and to control charging start, charging end, and charging intensity of charging equipment may be included. As shown in FIG. 7, the controller C is connected to the charging equipment M to control charging start, charging end, and charging intensity of charging equipment. Particularly, in the case in which the charging equipment M is a mobile charging robot, the controller C may control movement time, movement order, movement route, and movement speed to the space at which the vehicle is parked depending on the parking space information.

A billing unit P has or receives a predetermined billing database about a charging fee and/or parking fee per hour, receives charging result information from the charging equipment M after charging end, and calculates an amount of money to be charged to the user of the vehicle. As shown in FIG. 7, the management server S may receive the calculation result from the billing unit, or may calculate an amount of money to be charged to the user of the vehicle based on the billing database/received billing information. The vehicle, the vehicle information, the parking space information, the requested charging information, the necessary time information, the charging schedule, the charging result information, and the billing system, described herein, correspond to the terms used in the parked vehicle charging method according to each embodiment of the present disclosure.

In embodiments of the parked vehicle charging system, the vehicle information/parking space information/requested charging information/necessary time information are received to (re)schedule charging. In this manner, it is possible to induce charging concession of a previous charger, among the parked vehicles. Also, in embodiments of the parked vehicle charging system, a charging service combined with parking is provided, improving user convenience. Furthermore, limited charging equipment and charging capacity may be redistributed from a consumer who further requests discount to a consumer who further requests charging, whereby it is possible to improve charging service quality.

From the forgoing, in embodiments of the parked vehicle charging method and system, charging equipment, including a mobile charging robot, charges a vehicle that is parked in a state of being interlocked with parking space information of the vehicle while controlling charging intensity, an amount of money charged to a user of the vehicle is calculated, charging concession of a previous charger, among parked vehicles, is induced, providing a charging service combined with parking and improving user convenience. Furthermore, limited charging equipment and charging capacity are redistributed, providing improved charging service quality.

Although the preferred embodiments of the present disclosure have been described above with reference to the accompanying drawings, those skilled in the art will appreciate that the present disclosure can be variously modified and changed without departing from the technical idea of the present disclosure defined by the appended claims.

What is claimed is:

1. A parked vehicle charging method comprising:
inputting vehicle information of a vehicle that is parked, parking space information, charging information requested by the vehicle, and necessary time information preliminarily secured by the vehicle to a management server including a processor;
scheduling, by the management server, charging of the vehicle based on the requested charging information and the necessary time information of the vehicle;
charging, by charging equipment, the vehicle;
controlling, by the management server, charging intensity of the charging equipment based on the vehicle information of the vehicle, the parking space information, and a charging schedule;

receiving, by the management server, charging result information from the charging equipment after charging of the vehicle ends; and
calculating, by the management server, an amount of money to be charged to a user of the vehicle;
wherein, in the step of inputting the information to the management server, the requested charging information comprises information about an emergency charging intention for charging the vehicle that has priority over charging of another vehicle having different parking space information and an expected emergency charging time; and
wherein, in the step of scheduling charging of the vehicle, when there is an available fast charging time zone and the vehicle is an emergency vehicle,
comparing, by the management server, the necessary time information of the vehicle and the necessary time information of the another vehicle,
performing fast charging for the vehicle based on a result of the comparison of the necessary time information of the vehicle and the necessary time information of the another vehicle, and
scheduling charging of the another vehicle, and
wherein the scheduling charging of the another vehicle comprises converting charging of the another vehicle under fast charging into slow charging.

2. The parked vehicle charging method according to claim 1, wherein:
in the step of inputting the information to the management server, the requested charging information comprises at least one of a current charging amount, a requested target charging amount, or a requested minimum charging amount of the vehicle, and
in the step of scheduling charging of the vehicle, a possible charging service time for slow charging from the current charging amount to the requested target charging amount or the requested minimum charging amount during parking of the vehicle is scheduled.

3. The parked vehicle charging method according to claim 1, wherein, in the step of scheduling charging of the vehicle, charging of a vehicle having highest charging capacity is scheduled in a case in which there is a plurality of vehicles having different parking space information, and a vehicle having longest waiting time until completion is scheduled in a case in which the vehicles have identical charging amounts.

4. The parked vehicle charging method according to claim 1, wherein:
in the step of inputting the information to the management server, the necessary time information comprises at least one of expected parking time, expected charging time within the expected parking time, and expected fast charging time within the expected charging time, and
in the step of scheduling charging of the vehicle, the necessary time information of the vehicle to be scheduled and the necessary time information of the another vehicle having different parking space information are compared with each other to schedule a possible charging service time for fast charging.

5. The parked vehicle charging method according to claim 4, wherein:
in the step of inputting the information to the management server, the request charging information of the vehicle comprises at least one of a current charging amount of the vehicle or a requested minimum charging amount of the vehicle, and in the step of scheduling charging of the vehicle, in a case in which fast charging of the vehicle is impossible based on a result of the comparison of the necessary time information of the vehicle and the necessary time information of the another vehicle, information about a charging intention up to the requested minimum charging amount of the another vehicle having different parking space information is input and a possible charging service time for fast charging of the vehicle is scheduled based on scheduling charging of the another vehicle.

6. The parked vehicle charging method according to claim 5, wherein, in the step of calculating the amount of money to be charged, a predetermined discount rate based on charging up to the requested minimum charging amount of the other vehicle having different parking area information is applied to the amount of money to be charged based on charging result information to calculate the amount of money to be charged.

7. The parked vehicle charging method according to claim 4, wherein:

in the step of inputting the information to the management server, the requested charging information of the vehicle comprises at least one of a current charging amount, a requested target charging amount, or a requested minimum charging amount of the vehicle, and in the step of scheduling charging of the vehicle, necessary time information of the vehicles is compared to a plurality of other vehicles having different parking space information, and when fast charging of the vehicle is impossible based upon a result of the comparison, information about a charging release intention of a vehicle from the plurality of other vehicles having a current charging amount equal to or greater than a first charging amount is input and a possible charging service time for fast charging of the vehicle is scheduled based on scheduling charging of the vehicle having a current charging amount equal to or greater than a first charging amount.

8. The parked vehicle charging method according to claim 7, wherein, in the step of calculating the amount of money to be charged, a predetermined charging rate differently set with respect to a plurality of sections divided by the current charging amounts of the vehicles is applied to the amount of money to be charged based on charging result information to calculate the amount of money to be charged.

9. The parked vehicle charging method according to claim 7, wherein, in the step of scheduling charging of the vehicle, information about a charging release intention of a vehicle from the plurality of other vehicles having a current charging amount equal to or greater than a first charging amount and having a highest charging amount is input and a possible charging service time for fast charging of the vehicle is scheduled based on scheduling charging of the vehicle having a current charging amount equal to or greater than a first charging amount and having a highest charging amount.

10. The parked vehicle charging method according to claim 9, wherein, in the step of scheduling charging of the vehicle, in a case in which there is a plurality of other vehicles having highest charging amounts, information about a charging release intention of a vehicle having a lowest amount of money to be charged to the user of the vehicle based on charging result information is input and a possible charging service time for fast charging is scheduled.

11. The parked vehicle charging method according to claim 1, wherein, in the control step, the charging equipment is a mobile charging robot.

12. The parked vehicle charging method according to claim 1, further comprising comparing necessary time information of the vehicle to be scheduled and necessary time information of the another vehicle having different parking space information with each other to schedule charging of the another vehicle after the step of scheduling charging of the vehicle, wherein the management server transmits scheduling information and information about a predetermined discount rate based thereon to a user terminal of the other vehicle in the step of scheduling charging of the other vehicle.

13. The parked vehicle charging method according to claim 1, wherein, in the step of scheduling charging, information included in scheduling of charging comprises at least one selected from the group consisting of: whether slow charging is possible, whether fast charging is possible, a charging fee based on slow charging or fast charging, an additional fee at a time of emergency charging, an additional fee at a time of fast charging, charging schedule information scheduled at a time of fast charging in an identical time zone to the another vehicle having different parking space information, charging release information based on emergency charging of the another vehicle having different parking space information, a discounted fee at a time of charging release or scheduling, or expected time taken until charging is completed.

14. A parked vehicle charging system comprising:

a charging equipment configured to charge a vehicle; and a management server including a processor and configured to:

schedule charging of a vehicle that is parked based on charging information requested by the vehicle and necessary time information preliminarily secured by the vehicle;

control charging intensity of the charging equipment based on vehicle information, parking space information, and a charging schedule of the vehicle;

receive charging result information from the charging equipment after charging of the vehicle ends; and calculate an amount of money to be charged to a user of the vehicle;

wherein the requested charging information comprises information about an emergency charging intention for charging the vehicle that has priority over charging of another vehicle having different parking space information and an expected emergency charging time; and wherein, when there is an available fast charging time zone and the vehicle is an emergency vehicle, the management server is configured to:

compare the necessary time information of the vehicle and the necessary time information of the another vehicle, perform fast charging for the vehicle based on a result of the comparison of the necessary time information of the vehicle and the necessary time information of the another vehicle, and schedule charging of the another vehicle;

wherein scheduling charging of the another vehicle converting charging of the another vehicle under fast charging into slow charging.

* * * * *